(12) United States Patent
Magner et al.

(10) Patent No.: US 6,789,003 B2
(45) Date of Patent: Sep. 7, 2004

(54) CONTROL MODULE FOR PROVIDING ACCESS, MONITORING VEHICLES STATES, AND CONTROL OF A VEHICLE

(75) Inventors: Dave Magner, Calmar, IA (US); Rick McIntosh, Altoona, IA (US); Julie M. Houdek, New Hampton, IA (US)

(73) Assignee: Tri/Mark Corporation, New Hampton, IA (US)

( * ) Notice: Subject to any disclaimer, the term of this patent is extended or adjusted under 35 U.S.C. 154(b) by 7 days.

(21) Appl. No.: 10/213,461

(22) Filed: Aug. 6, 2002

(65) Prior Publication Data

US 2004/0030462 A1 Feb. 12, 2004

(51) Int. Cl.$^7$ .............................................. G06F 17/00
(52) U.S. Cl. ............................................ 701/2; 701/36
(58) Field of Search ................................ 701/2, 29, 36, 701/33; 340/5.54, 5.62, 5.22, 825.14; 307/10.2, 10.3

(56) References Cited

U.S. PATENT DOCUMENTS

| | | | |
|---|---|---|---|
| 4,205,325 A | 5/1980 | Haygood | 340/870.11 |
| 4,206,491 A | 6/1980 | Ligman | 361/172 |
| 4,488,056 A | 12/1984 | Mochida | 307/10.2 |
| 4,688,036 A | 8/1987 | Hirano | 340/825.52 |
| 4,742,327 A | 5/1988 | Burgess | 340/426.36 |
| 4,942,393 A | 7/1990 | Waraksa | 340/5.62 |
| 5,109,221 A | 4/1992 | Lambropoulos | 340/5.22 |
| 5,113,182 A | 5/1992 | Suman | 340/5.28 |
| 5,148,348 A | 9/1992 | White | 361/658 |
| 5,278,547 A | 1/1994 | Suman | 340/5.22 |
| 5,402,322 A | 3/1995 | Kunkler | 361/809 |
| 5,442,341 A | 8/1995 | Lambropoulos | 340/5.26 |
| 5,467,080 A | 11/1995 | Stoll | 340/5.54 |
| 5,650,774 A | 7/1997 | Drori | 340/5.22 |
| 5,669,522 A | 9/1997 | Million | 220/4.02 |
| 5,767,588 A | 6/1998 | Nakaya | 307/10.2 |
| 5,907,195 A | 5/1999 | Issa | 307/10.3 |
| 5,973,611 A | 10/1999 | Kuhla | 340/5.62 |
| 6,031,465 A | 2/2000 | Burgess | 340/5.54 |
| 6,084,317 A | 7/2000 | Wolfe | 307/10.4 |
| 6,202,008 B1 * | 3/2001 | Beckert et al. | 701/33 |
| 2003/0028299 A1 * | 2/2003 | Stouffer et al. | 701/36 |

* cited by examiner

*Primary Examiner*—Marthe Y. Marc-Coleman
(74) *Attorney, Agent, or Firm*—McKee, Voorhees & Sease, P.L.C.

(57) ABSTRACT

A control module for receiving inputs and outputs associated with providing access to and control of a vehicle is disclosed. The control module includes a housing adapted for mounting within the vehicle, an intelligent control disposed within the housing, the intelligent control having a plurality of inputs for sensing vehicle states, a plurality of electronic access inputs for receiving user instructions, and a plurality of outputs from the intelligent control for controlling vehicle functions. The intelligent control is adapted for sending and receiving messages via a multiplexing protocol. The control module can be programmed to provide customized functions for different vehicles.

21 Claims, 7 Drawing Sheets

CONTROL MODULE FOR PROVIDING ACCESS, MONITORING VEHICLES STATES, AND CONTROL OF A VEHICLE

BACKGROUND OF THE INVENTION

This invention relates to providing secured access, monitoring of vehicle states, and controlling vehicle functions. More specifically, this invention relates to a control module for determining vehicle states or condition and controlling vehicle functions that is capable of sending and receiving messages, including communicating via a multiplexing protocol to other control modules or other vehicle devices.

There have been various attempts to provide for the control of vehicle functions either remotely via a keyfob transmitter or through a keypad associated with a door. In many of these systems, the vehicle's wiring harness is adapted to specifically accommodate the particular vehicle functions controlled. Integration in this manner results in a system with little opportunity or added challenges for customization.

One such attempt is disclosed in U.S. Pat. No. 5,278,547 to Suman et al. In Suman, a vehicle control system includes a microcontroller based switch programmable module which allows different vehicle options to be selectively actuated by different vehicle users. The Suman system can include a keypad and/or an RF receiver. The Suman system, however, provides only for a limited number of predefined inputs and outputs that a vehicle may be prewired to support, and then these inputs and outputs are selectively enabled if present in the vehicle. Thus, the Suman system requires prewiring of the vehicle harness or other integration problems. Thus problems remain in providing flexibility and expandability in vehicle access and control.

These problems are particularly apparent as they relate to the manufacture of non-automotive vehicles. Many vehicles are far more complicated than cars. For example, recreational vehicles (RVs), trucks, specialty vehicles, emergency vehicles, construction equipment, agricultural equipment and other types of vehicles may be large in nature and have numerous features or amenities that it would be useful and desirable to control without the operator being physically located in the drivers' seat. These types of vehicles may have multiple entry doors, multiple compartments on the inside or outside of the vehicles, gas compartment doors, maintenance doors, various lighting fixtures on the inside or outside of the vehicle, and numerous other functions some of which may be highly specialized. These vehicles are more likely to need greater customization. Therefore reworking the wiring harness for each specific application is impractical and cost prohibitive. Thus systems in the prior art that rely upon prewiring of inputs and outputs in the wiring harness are not desirable.

Therefore, it is a primary object, feature, or advantage of the present invention to improve upon the state of the art.

It is a further object, feature, or advantage of the present invention to provide a modular solution for controlling vehicle functions and sensing vehicle states or conditions.

Another object, feature, or advantage of the present invention is to provide a control module that is customizable in terms of outputs related to vehicle functions and inputs related to vehicle states or conditions without requiring reconfiguration or redesign of the vehicle's wiring harness.

It is a further object, feature, or advantage of the present invention to provide a control module for a vehicle access, sensing of vehicle states or conditions, and control of vehicle functions that provides for a multiplexing network protocol for communicating with other control modules, access modules, or other aspects of the vehicle.

Another object, feature or advantage of the present invention is to provide a control module for a vehicle access and control system that can use both a remote transmitter and one or more keypads.

Yet another object, feature, or advantage of the present invention is to provide a control module for a vehicle access and control system that can be used to both sense or monitor states or conditions associated with the vehicle as well as to control functions of the vehicle.

A further object, feature, or advantage of the present invention is to provide a control module for a vehicle that provides for staggered outputs to reduce peak current allowing for reduced costs of installation and manufacturing.

Another object, feature, or advantage of the present invention is to provide a control module for a vehicle that allows different vehicle outputs or vehicle functions to be enabled or disabled.

A still further object, feature, or advantage of the present invention is to provide a control module for a vehicle access and control system for a vehicle that has numerous vehicle functions, vehicle features or vehicle amenities.

These and other objects, features, and/or advantages of the present invention will become apparent from the specification and claims that follow.

SUMMARY OF THE INVENTION

The present invention provides secured access to a vehicle without requiring keys or requiring that the operator be inside of the vehicle. The present invention provides for both sensing inputs or states or conditions associated with the vehicle as well as controlling functions or outputs of the vehicle. The system is flexible and allows for customization without requiring modifications to the vehicle's wiring harness. The system can monitor and control discrete signals. The system can also communicate over a network such that multiple control modules can work together, or else a control module can communicate with other intelligent devices present in the vehicle. This I/O module can be programmed to provide customized functions for different vehicles.

According to one aspect of the present invention, a control module for receiving inputs and outputs associated with providing access to and control of a vehicle includes a housing adapted for mounting within the vehicle, an intelligent control disposed within the housing, the intelligent control having (a) a plurality of inputs for sensing vehicle states or conditions; (b) a plurality of electronic access inputs for receiving user instructions; and (c) a plurality of outputs from the intelligent control for controlling vehicle functions. The intelligent control is adapted for sending and receiving messages via a multiplexing protocol.

According to another embodiment, the control module provides for receiving inputs and providing outputs associated with providing access to and control of a vehicle. The control module includes a housing adapted for mounting within the vehicle, a network connection disposed within the housing for sending and receiving messages via a multiplexing protocol, an intelligent control electrically connected to the network connection and adapted for using the multiplexing protocol, the intelligent control disposed within the housing, a plurality of outputs operatively connected to the intelligent control adapted for controlling vehicle functions, a plurality of inputs operatively connected to the intelligent control for determining vehicle states or conditions, and the intelligent control is operatively connected to a radio frequency receiver for receiving user instructions from a remote transmitter in communication with the receiver.

DETAILED DESCRIPTION OF THE INVENTION

Figure 1:
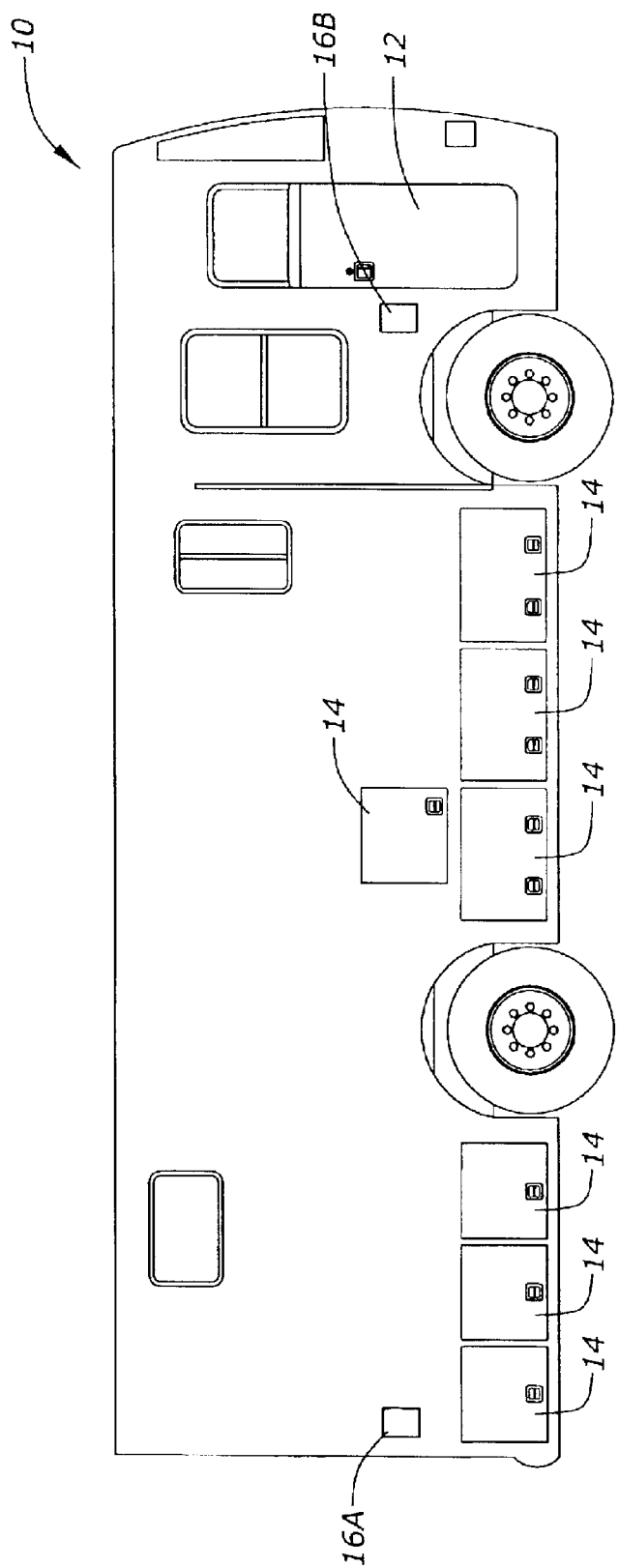
FIG. 1 is a side view of a vehicle equipped with a secured access system according to one embodiment of the present invention.

The present invention provides for a control module to be used in a vehicle for sensing vehicle states or conditions and controlling vehicle functions. FIG. 1 illustrates a vehicle 10 according to one embodiment of the present invention. The vehicle 10 shown is an RV, however, the present invention is in no way limited for use in an RV. The present invention can be used in numerous applications, including vehicles such as ambulances, semi-truck tractors, construction equipment, and other types of vehicles. The vehicle 10 shown has a passenger door 12 and a number of different compartment doors 14. The compartment doors 14 are spread out along the passenger side of the vehicle 10. Two different access modules 16 are also shown. The access modules 16A and 16B can be keypads. Access modules 16A and 16B are located on different ends of the vehicle 10 with access module 16B being located adjacent the passenger door 12 and access module 16A being located adjacent the rear most compartment doors 14. Although only two access modules 16A and 16B are shown, the present invention contemplates that numerous access modules can be provided. The access modules 16A and 16B can be keypads that require a security code prior to being used to control vehicle functions. Alternatively, the present invention contemplates that the access modules can otherwise provide for secured access. For example, biometric systems, including, but not limited to finger print access systems or retinal scanning systems can be used. Further, various transponder or transceiver systems could also be used.

An operator of the vehicle 10 can use access module 16B to open the passenger door 12 and enter the vehicle 10. The operator can also use the access module 16A to open various compartment doors 14, including the rear most doors 14. The present invention also provides for any number of sensors or switches to be placed throughout vehicle 10. These sensors or switches can include, without limitation, door ajar switches, interior lock/unlock (i.e. momentary rocker) manual switches, and other types of switches.

Figure 2:
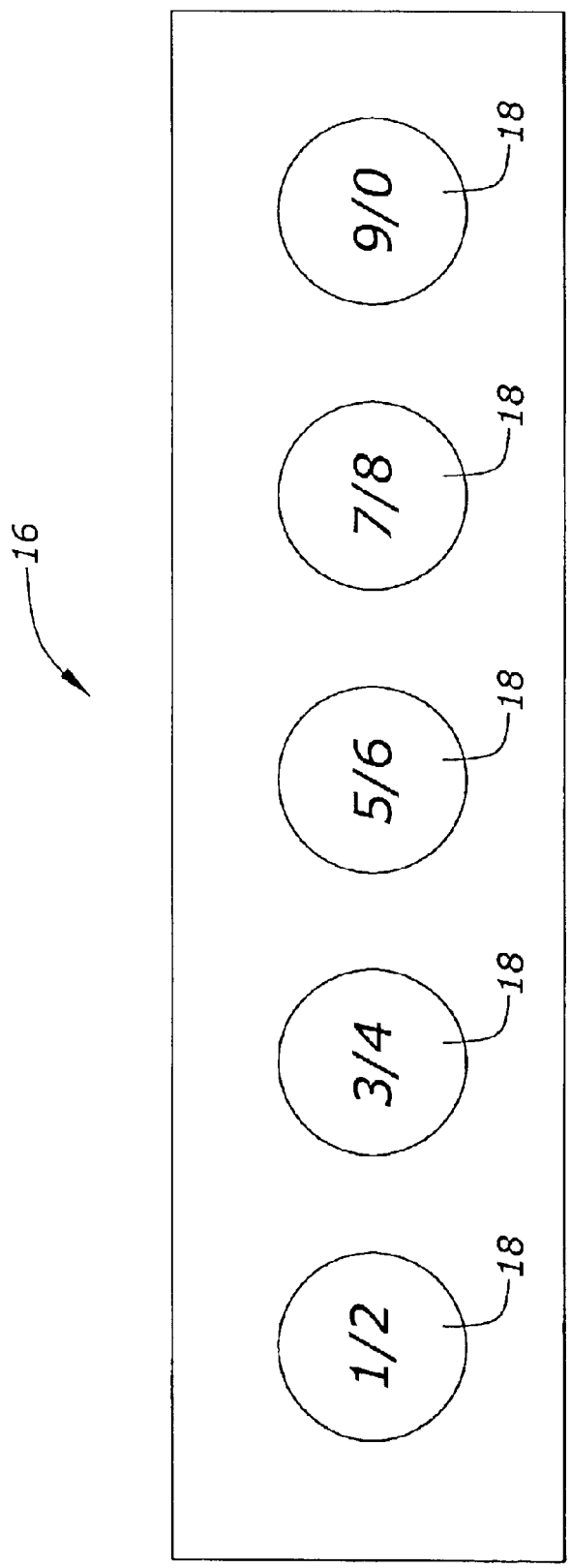
FIG. 2 is a front view of one access module according to one embodiment of the present invention.

To aid in providing one context of the present invention, FIGS. 2–5 show the aspects of one system in which the control module of the present invention operates. FIG. 2 illustrates a keypad access module 16. In the keypad access module 16, a plurality of buttons 18 is shown. Preferably the keypad module is adapted to communicate with the control module through network communication.

Figure 3:
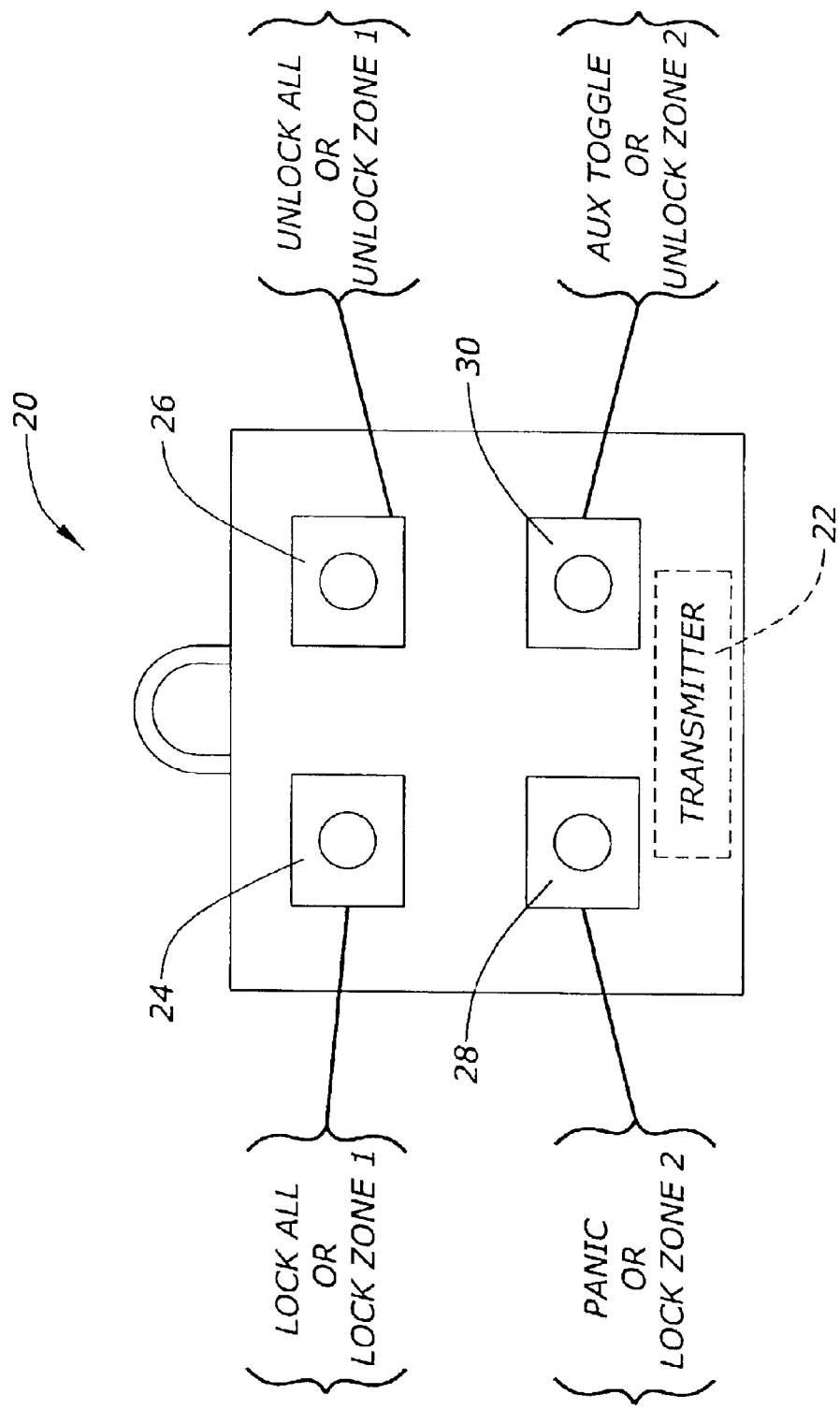
FIG. 3 is a front view of a key fob transmitter.

FIG. 3 provides a front view of a key fob transmitter 20 that can be used with the control module of the present invention. The key fob transmitter 20 includes buttons 24, 26, 28, and 30. The buttons 24, 26, 28, and 30 are associated with different vehicle functions. For example, button 24 can be associated with a function to lock all doors or to lock only those locks associated within a particular zone of the vehicle. Similarly, the button 26 can be used to unlock all the doors or unlock locks associated with a zone of a vehicle. The button 28 can be used to toggle an auxiliary function or to lock a second zone of the vehicle. The button 30 can be used as panic button, such as to activate the vehicle horn or lights or to unlock a second zone of the vehicle. In addition, a transmitter 22 is a part of the key fob 20 device. Although a keyfob transmitter is shown, the present invention contemplates that other types of transmitters or transponders can be used in a remote system.

Exemplary configurations for the keyfob connections at the control module 38 are set forth in the following table, however the present invention contemplates numerous variations.

| Connection | Vehicle function | # of inputs | Description |
|---|---|---|---|
| 1 | Lock all or lock zone 1 | 1 | Button 1 |
| 2 | Unlock all or zone 1 | 1 | Button 2 |
| 3 | Aux 1 toggle or lock zone 2 | 1 | Button 3 can be an auxiliary or compartment door unlock/lock |
| 4 | Panic or unlock zone 2 | 1 | Button 4 can be panic or compartment door lock/unlock |

Figure 4:
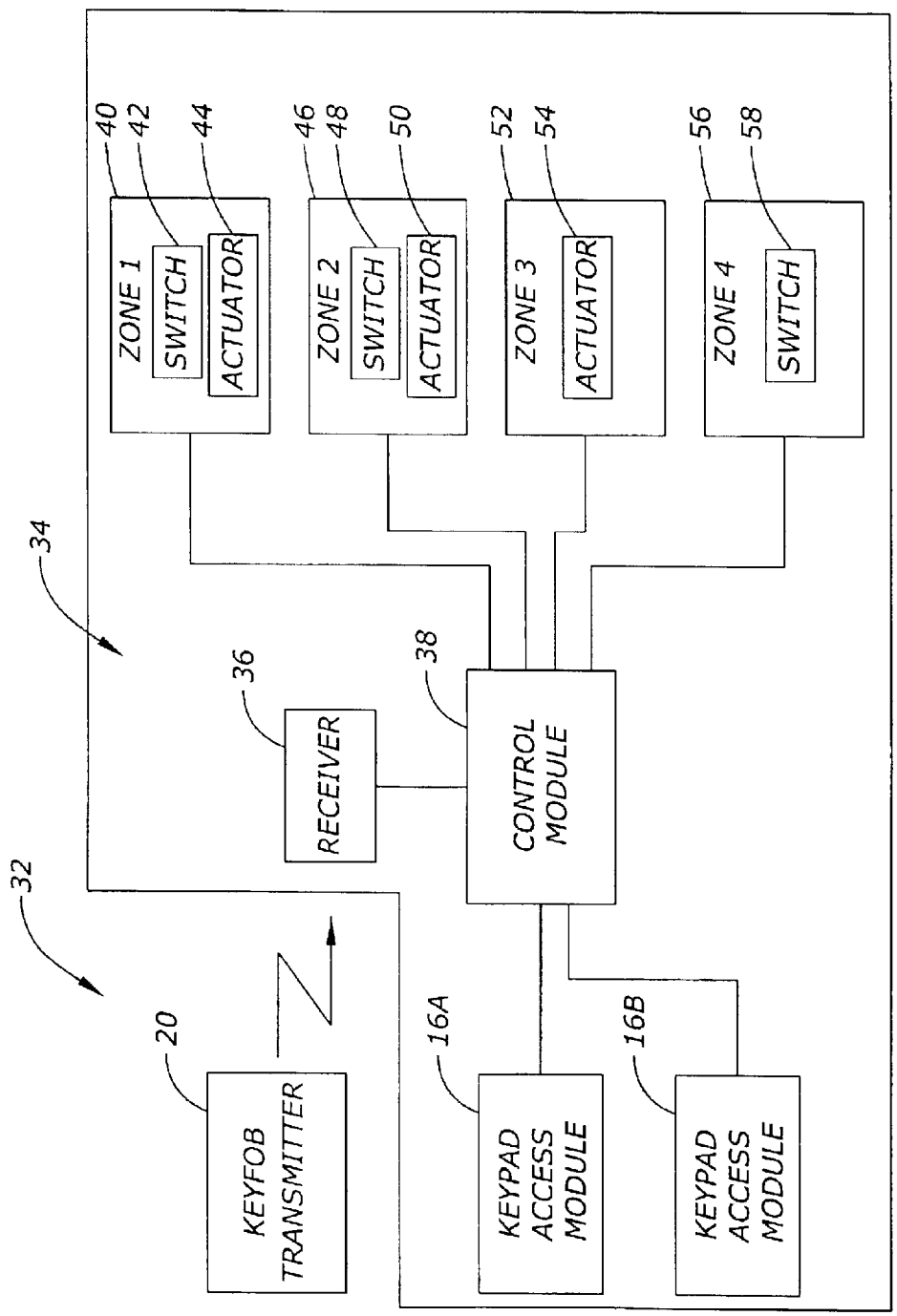
FIG. 4 is a block diagram showing the control module of the present invention within a vehicle system.

FIG. 4 provides a block diagram showing one embodiment of the relationship of the control module of the present invention other aspects of the vehicle according to one embodiment of the present invention. The system 32 includes a key fob transmitter unit 20 and a vehicle subsystem 34. The vehicle subsystem 34 includes a receiver 36 in communication with the key fob transmitter 20. The key fob transmitter 20 communicates with the receiver 36 through RF communications or otherwise. The receiver 36 is electrically connected to a control module 38. A control module 38 is also connected to one or more keypad access modules 16A and 16B. In addition to these inputs, the control module 38 includes a number of outputs. The control module 38 is used to control a plurality of zones. A zone is a grouping of access doors, which would contain either lock/unlock actuators, door opening actuators, or other electronic switches associated with a vehicle and vehicle functions. For example, various switches can be used to control lighting, various actuators can be used to control locking and unlocking compartment doors or entry doors, opening doors, or other vehicle functions. For illustrative purposes, a first zone 40 is shown containing both a switch 42 and an actuator 44. A second zone 46 is shown containing both a switch 48 and an actuator 50. A third zone 52 is shown containing an actuator 54 and a fourth zone 56 is shown containing a switch 58. The present invention contemplates numerous zones and within each zone the present invention contemplates that any number of electronic switches and/or actuators may be used. A single input can be associated with a zone instead of a single vehicle function. For example, a single input can be used to lock all compartment doors within a particular zone instead of having a separate input for each compartment door within the zone. The following table sets forth some examples of vehicle functions that can be associated with an input:

| Connection | Vehicle function | # of inputs |
|---|---|---|
| 1 | Lock all or lock entry door zone 1 | 1 |
| 2 | Unlock all or Unlock entry door zone 1 | 1 |
| 3 | Lock zone 3 or Lock all compartments | 1 |
| 4 | Unlock zone 3 or Unlock all compartments | 1 |
| 5 | Lock zone 4 or aux input | 1 |
| 6 | Unlock zone 4 or aux input | 1 |
| 7 | Actuate Zone 6 | 1 |
| 8 | Spare Aux 1 Toggle | 1 |
| 9 | Spare Aux 2 Toggle | 1 |
| 10 | Entry door ajar | 1 |
| 11 | Compartment door ajar | 1 |
| 12 | Door trigger 3 | 1 |

Figure 5:
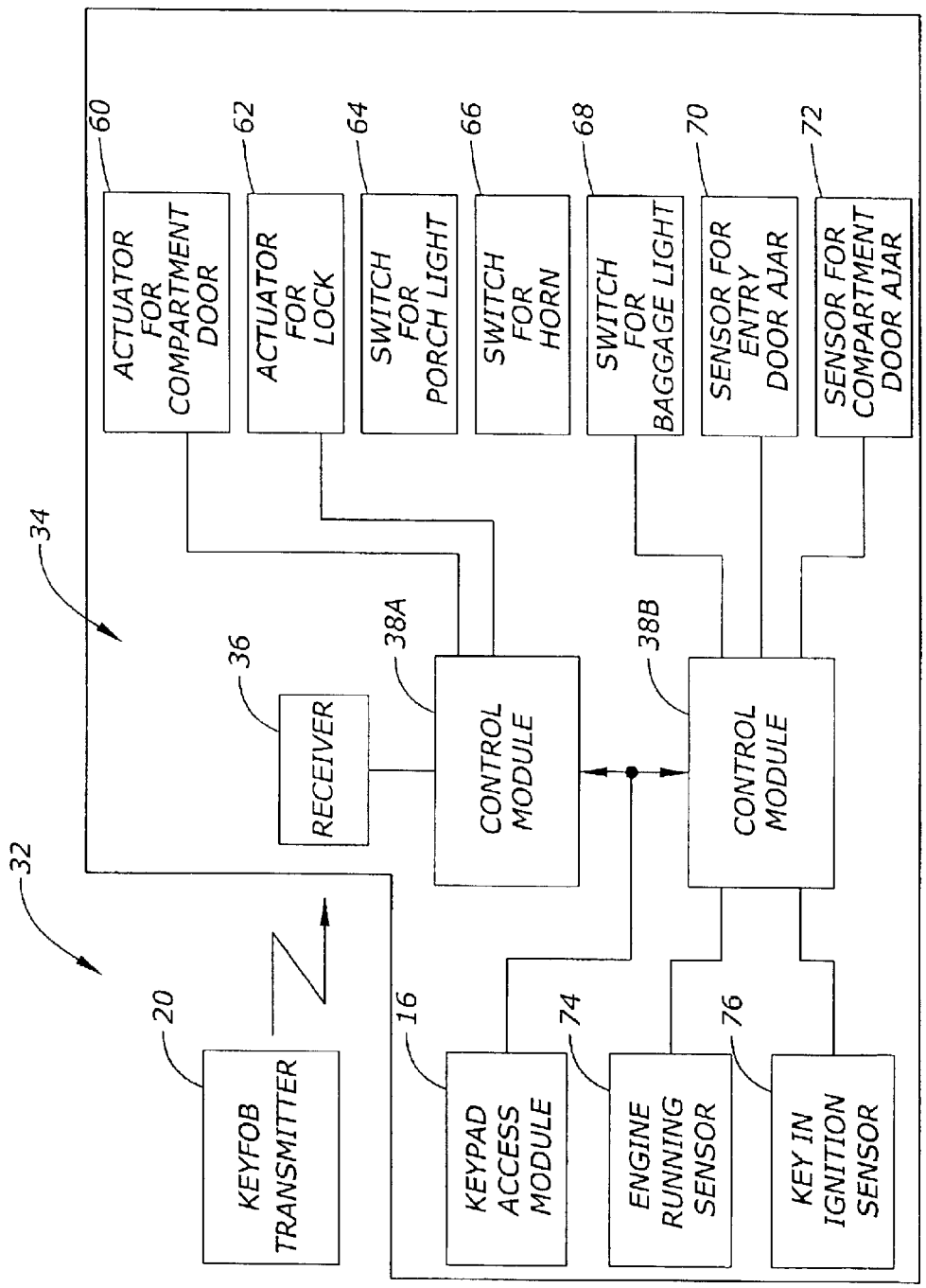
FIG. 5 is a block diagram showing the control module of the present invention within a vehicle system in a different configuration.

FIG. 5 provides another embodiment of the relationship of the control module 38 of the present invention within a system. In FIG. 5, multiple control modules are shown. A first control module 38A and a second control module 38B are shown. The present invention contemplates that numerous control modules 38 can be used. Where more than one control module 38 is used, the control modules 38 communicate through network communication. By daisy chaining the control modules 38, additional inputs and outputs to the access system can be provided.

Figure 6:
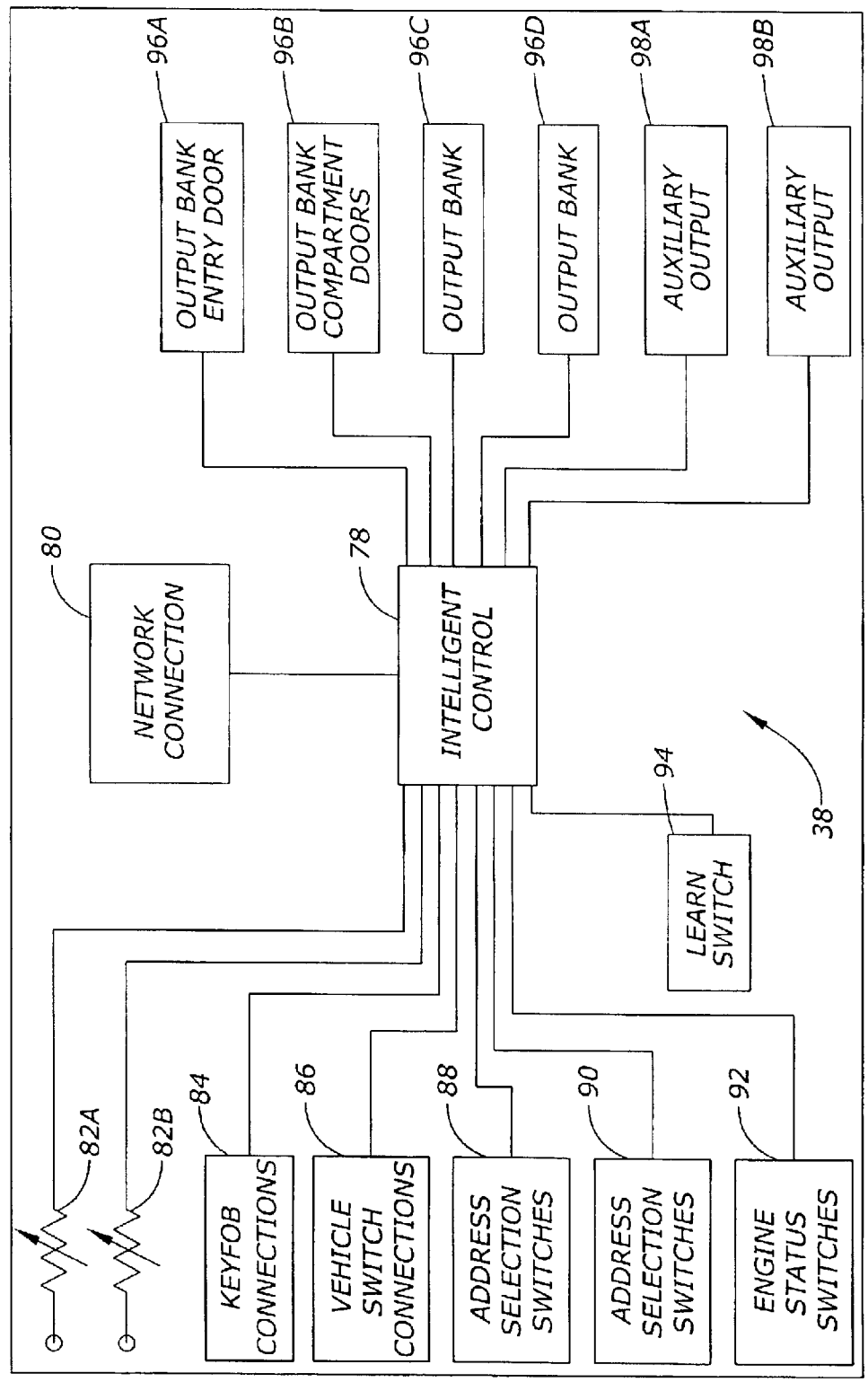
FIG. 6 is a block diagram of the control module of the present invention.
Figure 7:
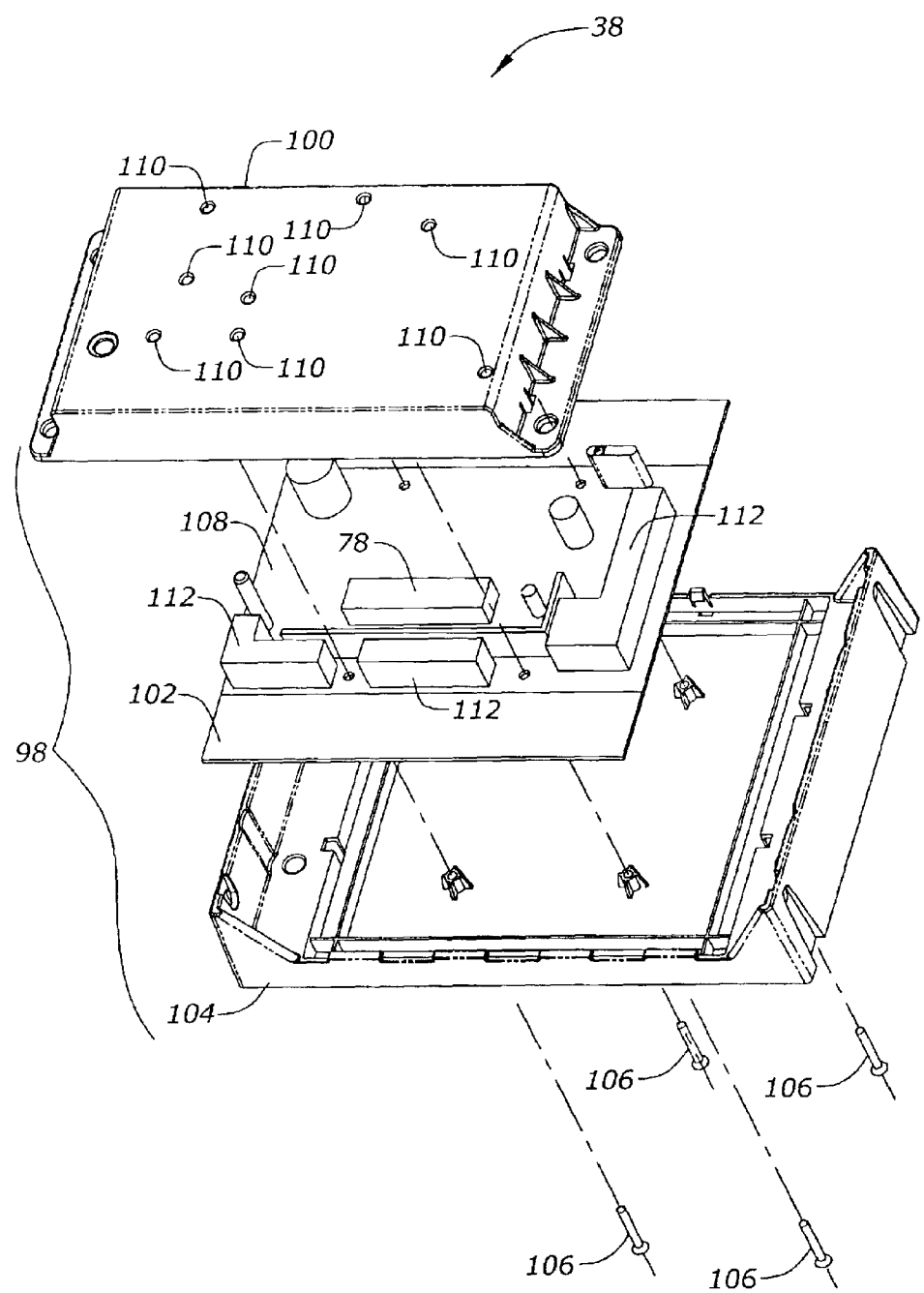
FIG. 7 is an exploded perspective view of the control module of the present invention.

FIG. 6 provides a block diagram of the control module 38 of the present invention. The control module 38 provides for various inputs and outputs, those shown are merely exemplary. The control module 38 includes an intelligent control 78. The intelligent control 78 can include a processor, microcontroller, ASIC, or other circuit. One example of a processor that can be used is a Microchip PIC. A network connection 80 is electrically connected to the intelligent control 78. The network connection 80 can be a two wire connection such as in an RS-485 network, or other type of network connection, preferably that allows for the use of a multiplexing protocol. A plurality of analog delay settings 82A and 82B are also shown. The analog delay settings 82A and 82B allow for the activation of outputs to be adjustably delayed. As shown, the delay is set by adjusting a variable resistor, although the present invention contemplates that the delay can be otherwise set, including through the use of switches, or through software.

The present invention provides for communication between controller modules 38. In one embodiment, each controller modules can send multiplexed messages to and from other controller modules. This allows a system of the present invention to provide for expansion in that additional inputs and/or outputs can be used. The present invention provides for network communication between controller modules. Any number of protocols and/or message formats may be used. According to one embodiment a physical layer based on the Society of Automotive Engineers (SAE) J1708 electrical standard is used. This standard provides for serial data communications links. According to one embodiment of the present invention an AMP connector is used providing a four pin connection. The present invention contemplates numerous variations in the protocol used. According to one embodiment of the present invention, the messages sent begin with an 'STX' (02H) character and end with an 'ETX' character. These are transmitted at 2400 baud with 8 data bits and 1 stop bit. Various commands can then be used as may be appropriate in a particular environment or application. The commands can include commands to learn and/or change programming, commands that will change security codes, commands that will lock all doors, commands to unlock a particular zone, commands to unlock all zones, commands to toggle an auxiliary output, commands to send a pulse output, commands to change the status (for example to change between a secure mode and an unsecure mode), commands to indicate errors, and commands to issue a wakeup to particular devices.

For example, the command to learn or change programming can be a "CP." This command can be sent by any device. All devices with learning capability will go into their learn mode for their specified time limits when this command is sent.

Another command that can be sent is a change of code command. The change of code command can include the new code as well as a code checksum. Where a five digit code is used, the command string "CA#####$" can be sent to change code A. The present invention contemplates that multiple codes can be used for different keyfob transmitters or access modules. The "#####" in the command string indicates the code. The "$" in the command string is used as a checksum verification of the code received. It can be calculated by adding the numeric values of the numbers in the code and then taking module 10 of that sum and converting to the ASCII equivalent. For example the code 12345 would be summed to 1+2+3+4+5=15, and mod 10 of that is 5 such that the "$" in the command string could be replaced by "5" in that instance. The present invention contemplates that other sizes of codes can be used and other or no checksums can be used.

A further example of a command is "LA" to lock all. This command can be sent by any device. All devices that can control locks will start the process to lock all doors when this command is sent. The present invention can provide for sequentially actuating locks to avoid the increased current considerations when all locks are simultaneously actuated. Once all of the locks are considered secure, a corresponding secure status message can be sent.

Another example of a command is to unlock a particular zone. For example the command "U1" can be used to unlock zone 1. This command can be sent by any device. Any device that can control zone 1 locks will then unlock zone locks when it receives this command. An unsecure status message can sent when complete. A similar command to unlock all zones is "UA." This command can also be sent by any device and can be used to initiate the process of unlocking all doors. When any lock is considered unsecure, a corresponding unsecure status message can be sent.

An auxiliary output toggle command can be sent as "A1" by any device. Any device controlling an auxiliary output 1 can then turn the output on until a timeout occurs (if set) or until toggled off by the same command message or others. Similarly, commands "A2" through "A9" can be used to toggle auxiliary outputs 2–9.

A pulse output command can be sent as "P1" by any device. Any device controlling the corresponding pulsed output 1 can then pulse the output. Similarly, commands "P2" through "P9" can be used to pulse outputs 2–9.

Status messages are sent by control modules and not by every device. A secure mode status message such as "MS" indicates that the vehicle is secure. An unsecure mode status message such as "MU" indicates that the vehicle is not secure. The present invention contemplates that other types of status messages can be used.

The present invention also contemplates that error messages can be used. For example an "EK" can be sent to indicate that there is an error in the keypad unit. An "EL" can be sent to indicate that three wrong codes have been entered. An "EC" can be sent to indicate a bad code checksum. Other error codes can be set to indicate other types of errors. The error codes are sent through the network to provide an indication that an error has occurred. For example, an LED or other visual display can be used to provide feedback to an operator that an error has occurred. A different LED can be used for each type or error, or preferably, a single LED can blink a particular number of times to indicate a particular error condition. The present invention contemplates that instead of an LED, other types of lighting devices can be used to provide visual feedback of error conditions to an operator.

Another type of message that can be sent is a wake up message. One command string that can be used is "WU". The wake up message can be sent by any device receiving a stimulus from a user or otherwise. The "WU" can be used to cause dome lights to turn or for any number of other vehicle functions.

As shown in FIG. 5, the present invention provides for inputs such as sensors or switches to be used in addition to outputs. The first controller module 38A in FIG. 5 is electrically connected to an actuator 60 associated with a compartment door, an actuator 62 associated with an entry door lock, a switch for a porch light 64, a switch for the horn 66. The second controller module 38B is electrically connected to a switch or a baggage light 68, a sensor for an entry door ajar 70, a sensor for a compartment door ajar 72, an engine running sensor 74, and a key in ignition sensor 76.

The use of network communications allows the control module 38 to communicate with access modules such as keypad modules, other control modules, and other vehicle devices. Thus, vehicle harnesses do not need to be prewired as the control module can provide for sensing vehicle states through receiving inputs from switches or sensors or via the network. Similarly, the control module can provide for controlling vehicle functions through providing outputs to relays or other devices directly or via the network.

The present invention further allows for particular vehicle outputs to be enabled or disabled. For example, in specialized vehicles, there is various equipment associated with the vehicle. Such equipment can include motor or hydraulic controlled equipment such as winches, booms, and other equipment. The present invention allows for messages to be used to enable or disable particular equipment. This can be for safety reasons, or otherwise.

Thus each control module 38 can be used in conjunction with both inputs and outputs. The present invention contemplates that the controller module 38 can also communicate with other aspects of the vehicle. The system of the present invention therefore provides a convenient, flexible, and customizable means for providing secured access to a vehicle, for controlling vehicle functions, and monitoring vehicle states. The present invention further allows for the use of staggered outputs. This provides the benefit of being able to reduce the peak current. For example, instead of unlocking all doors at the same time, each door can be unlocked one at a time to reduce the peak current draw required to source all actuators. The use of staggered outputs allows relays with lower peak ratings to be used and wiring that is smaller or lower rated to be used as the peak current is reduced. Furthermore additional circuit protective devices, such as fuses, breakers, and the like, are less crucial and thus provide more simplistic electronics and wiring installation. Thus, the present invention can reduce the cost of installation and manufacture of the vehicle by using staggered outputs.

The present invention also contemplates that the control module 38 includes power management features to reduce power consumption. The present invention contemplates that a vehicle of the present invention can be seasonal and therefore may have long periods (i.e. months) without use. Thus, low power consumption is particularly important.

FIG. 6 provides an exploded perspective view of one embodiment of the control module of the present invention. The housing 98 includes a cover 100 and a base 104. In FIG. 6, a base 104 for the control module 38 is shown. A circuit board 102 snap fits into the base 104. A cover 100 snap fits over the printed circuit board (pcb) 102 and into the base 104. A plurality of screws 106 is also shown for connecting the parts of the housing 98. A plurality of cored holes 110 is present in the cover 100. The present invention contemplates that additional electronics or connectors (not shown) can be mounted to the cover through using the cored holes 110. For example, additional relays can be externally mounted in addition to those on the PCB 102 if desirable in a particular application. The housing 98 of the present invention allows the control module 38 to be easily mounted and to be conveniently placed in any number of locations within a vehicle.

Thus, a control module for providing vehicle access and control has been disclosed. The present invention contemplates numerous variations in the particular vehicle functions provided, variations in the specific inputs and outputs provided, the communication between controller modules, the number and type of access modules, and the types of vehicle used. These and other variations are well within the spirit and scope of the invention.

What is claimed is:

1. A control module for receiving inputs and outputs associated with providing access to and control of a vehicle, comprising:
   a housing adapted for mounting within the vehicle;
   an intelligent control disposed within the housing, the intelligent control having
      (a) a plurality of inputs for sensing vehicle states or conditions;
      (b) a plurality of electronic access inputs for receiving user instructions; and
      (c) a plurality of outputs from the intelligent control for controlling vehicle functions;
   the intelligent control adapted for sending and receiving messages via a multiplexing messaging protocol to a second control module.

2. The control module of claim 1 wherein the plurality of electronic access inputs for receiving user instructions include inputs for a radio frequency receiver.

3. The control module of claim 1 wherein the plurality of electronic access inputs for receiving user instructions includes inputs for at least one remote keypad wired to the control module.

4. The control module of claim 3 wherein the intelligent control communicates with the remote keypad using the multiplexing protocol.

5. The control module of claim 1 wherein the plurality of electronic access inputs for receiving user instructions include inputs for a radio frequency receiver and input for at least one remote keypad wired to the control module and adapted to send messages via a multiplexing messaging protocol.

6. The control module of claim 1 wherein the plurality of outputs includes at least one variable timed output.

7. The control module of claim 1 wherein the intelligent control is adapted to provide staggered activation of outputs to limit current draw.

8. The control module of claim 1 further comprising at least one lighting device for providing visual diagnosis feedback, the at least one lighting device electrically connected to the intelligent control.

9. The control module of claim 1 wherein the housing includes a base and a cover and further comprising a printed circuit board, the intelligent control being mounted on the printed circuit board, the printed circuit board being snap fit to the base, and the cover being snap fit to the base.

10. The control module of claim 9 further comprising a plurality of cored holes in the cover for mounting electronic components.

11. The control module of claim 1 wherein the intelligent control is adapted to provide an enable message to enable operation of vehicle equipment.

12. A control module for receiving inputs and outputs associated with providing access to and control of a vehicle, comprising:
   a housing adapted for mounting within the vehicle;
   a network connection disposed within the housing for sending and receiving messages via a multiplexing messaging protocol to a second control module;
   an intelligent control electrically connected to the network connection and adapted for using the multiplexing protocol, the intelligent control disposed within the housing;
   a plurality of outputs operatively connected to the intelligent control adapted for controlling vehicle functions;
   a plurality of inputs operatively connected to the intelligent control for determining vehicle states; and
   the intelligent control operatively connected to a radio frequency receiver for receiving user instructions from a remote transmitter in communication with the receiver.

13. The intelligent control of claim 12 wherein the intelligent control is adapted to receive user input messages from a keypad through the network connection.

14. The control module of claim 12 wherein the plurality of outputs includes at least one variable timed output.

15. The control module of claim 12 wherein the intelligent control is adapted to provide staggered activation of outputs to limit current draw.

16. The control module of claim 12 further comprising at least one visual display for providing visual diagnosis feedback, the at least one visual display electrically connected to the intelligent control independent of the operation of vehicle options.

17. The control module of claim 12 wherein the housing includes a base and a cover and further comprising a printed circuit board, the intelligent control mounted on the printed circuit board, the printed circuit board being snap fit to the base, the cover being snap fit to the base.

18. The control module of claim 17 further comprising a plurality of cored holes in the cover for mounting electronic components.

19. The control module of claim 12 wherein the messages include an enable and a disable message.

20. The control module of claim 12 wherein the messages include error messages.

21. A control module for receiving inputs and outputs associated with providing access to and control of a vehicle, comprising:
   a housing adapted for mounting within the vehicle;
   an intelligent control disposed within the housing, the intelligent control having
      (a) a plurality of inputs for sensing vehicle states or conditions;
      (b) a plurality of electronic access inputs for receiving user instructions; and
      (c) a plurality of outputs from the intelligent control for controlling vehicle functions;
   the intelligent control adapted for sending and receiving messages via a multiplexing messaging protocol to a second control module;
   the messages comprising command messages for controlling vehicle functions, status messages for providing an indication of a state of the vehicle, and error messages for indicating presence of error conditions.

* * * * *